Dec. 18, 1956  R. CUMMINGS  2,774,479
FILTERING APPARATUS
Filed Jan. 5, 1945  6 Sheets-Sheet 1

FIG_1_

INVENTOR.
Ross Cummings
BY
ATTORNEY.

Dec. 18, 1956

R. CUMMINGS 2,774,479

FILTERING APPARATUS

Filed Jan. 5, 1945

FIG_2_

FIG_3_

INVENTOR.
Ross Cummings

BY

Robert A. Lavender
ATTORNEY.

Dec. 18, 1956 R. CUMMINGS 2,774,479
FILTERING APPARATUS
Filed Jan. 5, 1945 6 Sheets-Sheet 4

FIG_6_

FIG_7_

FIG_8_

INVENTOR.
Ross Cummings
BY
ATTORNEY.

INVENTOR.
Ross Cummings
BY
Robert A. Lavender

United States Patent Office 2,774,479
Patented Dec. 18, 1956

2,774,479

FILTERING APPARATUS

Ross Cummings, Berkeley, Calif., assignor to the United States of America as represented by the United States Atomic Energy Commission Application January 5, 1945, Serial No. 571,421

4 Claims. (Cl. 210—184)

This invention relates to filtering systems, and particularly to filtering apparatus employing so-called "thimble" or "candle" filters in a manner designed to handle extremely valuable precipitates substantially without any loss.

In separating such precipitates from a liquid suspending medium, the volume of slurry to be handled may be relatively small as compared with that handled in most commercial filtration processes, and yet sufficiently great to require more efficient filtration methods and apparatus than are commonly available in a laboratory. The losses of precipitate encountered in using most commercial filtering devices, as a result of incomplete precipitate separation and because of difficulties encountered in completely removing the precipitate from the filtering medium, in cleaning the tanks, etc. and as a result of splashing, dripping, and other accidental losses, contribute to make such apparatus unsatisfactory for use on a small scale in the recovery of valuable material requiring the maintenance of precipitate losses at substantially zero.

It is an object of this invention to provide a combination filtering, washing, and drying system capable of efficiently handling a slurry which is available either in batches or in a small but constant flow of material.

It is a further object of this invention to accomplish the foregoing with a maximum efficiency of separation and with a minimum hold-up of material during the filtering, washing, and drying steps.

A further object of the invention is to provide apparatus capable of accomplishing a maximum through-put of material under conditions of high separating efficiency and minimum hold-up of material.

A further object is to provide apparatus capable of carrying out the filtering, washing, and drying steps in such a manner that substantially none of the precipitate to be filtered will be lost as a result of splashing, dripping, absorption, adherence to discarded, worn out, filtering media, or other such causes which make conventional filtering devices unsatisfactory for the handling of valuable materials.

A further object is to provide apparatus which, though in large part manually controlled, is equipped with certain protective features adapted to minimize the chances that the process will be disrupted or that valuable material will be lost or contaminated because of careless or faulty operation.

Further objects will become apparent from the following disclosure of specific embodiments of the invention.

For a complete understanding of the invention, several embodiments thereof are disclosed in the following detailed description and in the drawings in which.

Figure 1:
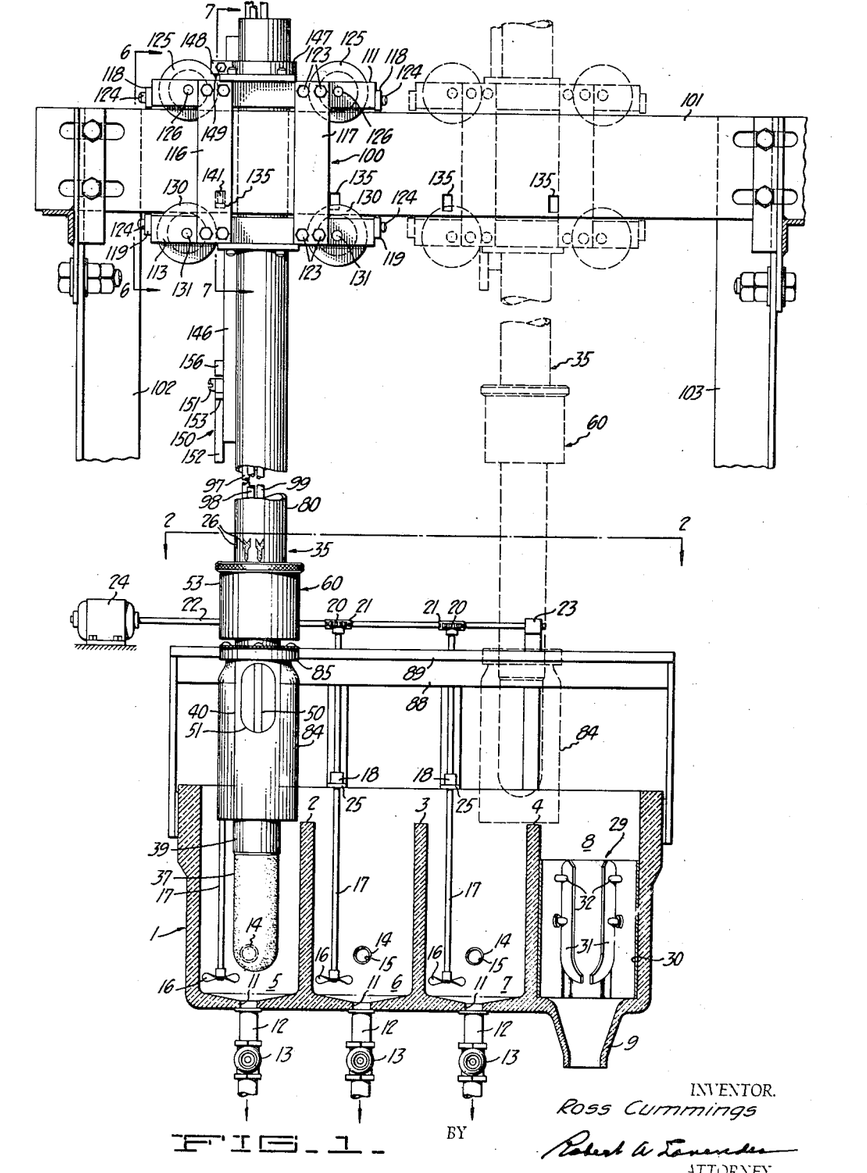
Figure 1 is an elevation, partly in section, showing a series of tanks or tank compartments and one of a pair of associated filter elements, its supporting structure, and apparatus for moving the same from tank to tank.
Figures 2, 3:
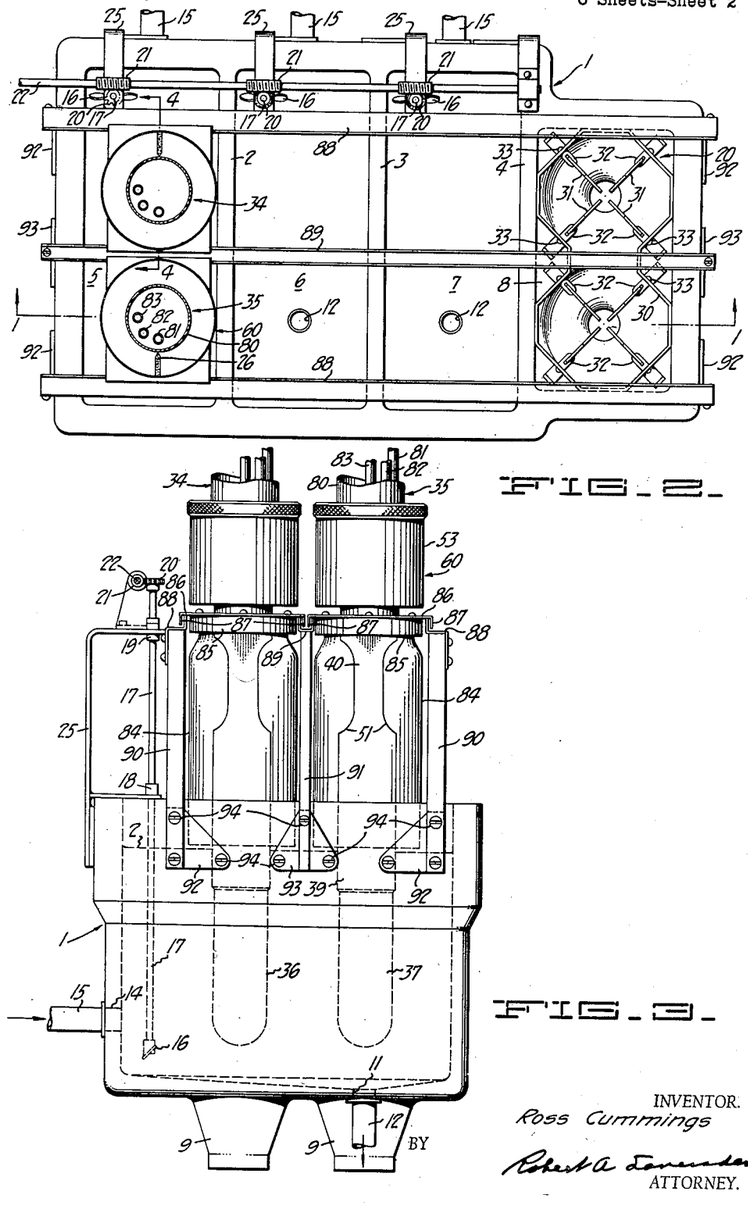
Fig. 2 is a plan view partly in section taken along the line 2—2 of Fig. 1.
Fig. 3 is an end elevation of the structure shown in Fig. 2.

Referring particularly to Figs. 1, 2, and 3, a receptacle, generally designated 1, made of any suitable non-porous material chemically resistant to the solutions to be contained therein, is divided by three partitions 2, 3, and 4 into four tanks or compartments 5, 6, 7, and 8. The tanks 5, 6, and 7 are respectively adapted to contain a slurry to be filtered, a suitable wash solution, and a suitable drying liquid such as a volatile, anhydrous, organic solvent; and the tank 8 is adapted to contain a pair of scraper units, generally designated 29 and described in more detail hereinafter. The bottoms of the first three tanks 5, 6, and 7 are sloped toward outlet openings 11, to which are connected outlet pipes 12 provided with suitable valves 13. Each of these three tanks 5, 6, and 7 is also provided with an opening 14 communicating with a pipe 15 for supplying to that tank the slurry, the wash solution, or the organic solvent to be contained thereby. Each of these three tanks 5, 6, and 7 may, if desired, also be provided with agitating apparatus which may comprise a propeller type blade 16 mounted on a vertical rotating shaft 17. In the example illustrated, each of the shafts 17 is journaled in a separate pair of bearings 18 and 19, and each carries at its upper end a spur gear 20 driven by an associated worm 21. The three worms 21 are mounted on a single, rotatable, horizontally extending shaft 22 journaled at one end in bearing 23 and supported at its opposite end and driven by a motor 24. Brackets 25, rigidly mounted in any suitable manner upon the receptacle 1, support the bearings 18, 19, and 23.

As mentioned above, the fourth tank 8 is provided with apparatus for removing the filter cake from each of two thimble filters to be employed in association with the first three tanks 5, 6, and 7. This apparatus 29 comprises a supporting framework 30 adapted to support two sets of scraper blades, each set comprising four blades 31. Each of the blades 31 is mounted on the supporting framework by slotted arms 32 suitably secured to the blades, as by welding, and to the supporting framework 30 by extensions passing through the supporting framework and riveted on the opposite side thereof, as shown at 33. Below each set of scraper blades, the tank 8 is provided with outlets 9 through which material removed by the blades 31 may fall into any suitable container (not shown).

The receptacle 1 and its associated apparatus described above is associated with two identical thimble filter elements 36 and 37, preferably made of a porous material such as electrically fused alumina. These filter elements, supported side by side as shown in Fig. 3, are adapted to be dipped together into the slurry tank 5 and to have suction applied to the insides of the filter elements to draw filtrate through their porous walls and to cause a filter cake to be loaded upon the outsides thereof. The filter elements carrying a cake of precipitate are adapted to be lifted vertically out of the slurry tank 5, moved horizontally into vertical alignment with the adjacent wash tank 6, and lowered vertically into the wash solution contained therein. In this position suction is again applied to the insides of the filter elements to cause wash solution to percolate through the filter cakes to the interior of the filter elements, displacing residual filtrate held by the filter cakes. The filter elements are then raised vertically out of the wash tank 6, moved horizontally to positions in alignment with the next adjacent tank 7, and lowered into the drying liquid contained in this tank 7. Suction is again applied to the insides of the filter elements to cause the drying liquid to percolate through the filter cakes to the interior of the filter elements, displacing residual wash solution held by the filter cakes. The filter elements are then raised vertically out of the drying liquid tank 7, this time with suction still applied, whereby air is drawn through the filter cakes causing the drying liquid to evaporate and leaving the filter cakes in a dry condition. The filter elements are then moved horizontally to positions in vertical alignment with the two sets of scraper blades 31 in the scraper tank 8 and are lowered into contact with the scraper blades. By rotating the filter elements through about a quarter of a turn while they are in contact with the scraper blades, the filter cakes are removed from the filter elements and fall through the outlet openings 9 below the scrapers, where the dry precipitate may be collected in any suitable manner.

The two filter elements 36 and 37 are independently supported side by side above the receptacle 1 by two filtering columns, generally designated 34 and 35, which are mounted for independent movement along parallel paths above the tanks and into alignment therewith in sequence. Referring for the moment only to the filtering column 35 shown in detail in Figs. 1 and 4, it will be observed that the filtering column includes a rotatable assembly consisting of the following principal elements: A lowermost thimble filter element 37; a filter head 38 to which the filter element is secured; a lower metal tube 39 integral with and supporting the filter head 38; an intermediate supporting metal tube 40 to which the lower supporting tube 39 is detachably connected; a rotatable portion of a valve unit, generally designated 60, detachably supporting the tube 40; a filtrate tube communicating with a port 57 of the valve unit 60 and comprising a transparent glass section 50 extending through the intermediate supporting tube 40 and a metal section 45 coupled to the lower end of the glass section 50 and extending through the lower supporting tube 39, through the filter head 38, and through the filter element 37 to a point adjacent the bottom of the latter. Each filtering column also includes a non-rotatable assembly that supports the rotatable assembly and that consists of a non-rotatable portion of the valve unit 60 (partially enclosed by the heavy black line A—B in Fig. 5) and a non-rotatable upper supporting tube 80 rigidly mounted in the non-rotatable portion of the valve unit. A separate carriage mechanism, generally designated 100, is provided for each filtering column. Each carriage 100 supports its associated filtering column for vertical sliding movement between an upper and a lower position (both shown in Fig. 1) so that the filtering column may be lowered into and raised out of a tank in alignment with and immediately below it, and is adapted to move along a horizontally extending track 101, when its associated filtering column is in its raised position, to move the filtering column horizontally and align it with an adjacent tank into which it may then be lowered. Separate, identical, parallel tracks 101 are provided for the two carriages 100, and each track is rigidly supported in proper alignment with the receptacle 1, as by vertical columns 102 and 103. Since the two assemblies of filtering columns and their associated carriages and tracks are identical in construction, only the assembly with which the above described filtering column 35 is associated has been shown completely in the drawings. The location of the assembly with which filtering column 34 is associated is apparent from Figs. 2 and 3, showing portions of both assemblies in side by side relation.

Figures 4, 5:
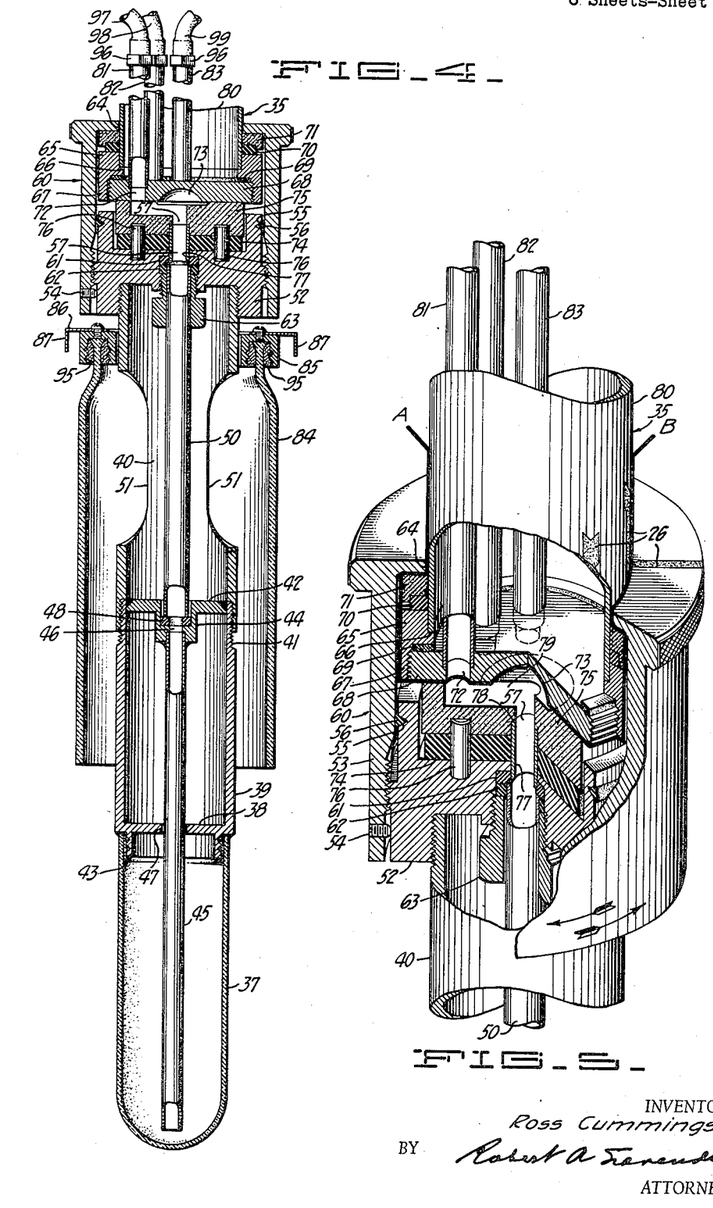
Fig. 4 is an enlarged vertical section taken on the line 4—4 of Fig. 2 and showing in detail the filter supporting structure and an associated valve mechanism.
Fig. 5 is a perspective view, partly in section, showing on an enlarged scale the valve mechanism of Fig. 4.

As shown in Fig. 4, the filter element 37 may be mounted on a stainless steel filter head 38 by means of a suitable cement 43. The filter head may be secured by welding to the lower supporting tube 39, also preferably made of stainless steel, or the filter head and lower supporting tube may be made integral as shown in Fig. 4; but the lower supporting tube is fastened to the intermediate supporting tube 40 by screw threads 41. The lower supporting tube carries a suction tube coupling assembly comprising a generally disk-shaped stainless steel member 42 welded to the upper end of the lower supporting tube 39. The coupling member 42 is provided at its center with a hollow boss 44 in which is mounted a stainless steel suction tube 45 communicating with a passageway 46 through the boss 44. The suction tube 45 passes through an aperture 47 in the filter head 38 to the inside of the filter element 37, terminating near the bottom thereof. The passageway 46 in the boss 44 also extends through a resilient ring 48, made of rubber or other suitable cushioning material, that provides a seat for a connecting suction tube 50 that extends into the hollow boss 44 and tightly engages the resilient ring 48 when the lower supporting tube 39 is screwed into the intermediate supporting tube 40. With this arrangement, the filter element 37, the filter head 38, the lower supporting tube 39, and the associated suction tube 45 may be detached from the intermediate supporting tube 40 in order to replace the filter element without disassembling the entire lower portion of the filtering column.

The intermediate supporting tube 40 is provided with a pair of window openings 51, and the suction tube 50 is made of glass or other transparent material, so that when the filter element 37 is lowered into one of the compartments 5, 6, or 7, as shown in Fig. 1, and suction is applied to the suction tube 50, the passage of liquid through the tube 50 may be observed and the entrainment of any solid material visually detected.

The intermediate supporting tube 40 threadedly engages at its upper end a generally cylindrical block 52, which in turn threadedly engages the interior of a cylindrical valve housing 53 and is held therein against unscrewing by a set screw 54. An annular groove 55 around the upper end of the block 52 accommodates a rubber packing ring 56, which bears against the inner surface of the cylindrical valve housing 53 to provide an air seal. The glass suction tube 50 is secured to the cylindrical block 52 in communication with the valve port 57 centrally located in the cylindrical block. The port opening is enlarged to accommodate a neoprene ring 61, a soft rubber ring 62 that fits tightly around one end of the glass tube 50, and a packing gland 63 that surrounds the glass tube 50 and is adapted to be screwed into the port 57 to force the soft rubber ring 62 into sealing contact with the neoprene ring 61 and with the glass tube 50. The top of the valve housing 53 is provided with a centrally disposed circular opening 64, and an upper, non-rotatable, supporting tube 80 for the valve unit and associated filter assembly is mounted in the opening 64 in a manner to be described.

As stated above, the valve unit 60 comprises a rotatable portion and a non-rotatable portion, separated in Fig. 5 by a heavy black line to facilitate visualizing the operation of the assembly. The non-rotatable portion of the assembly comprises a stainless steel collar 65 provided adjacent its upper, inner periphery with a seat 66 in which the lower end of the tubular support 80 is rigidly secured, as by welding. The lower end of the collar 65 is provided with a flange 67 that defines a seat for an asbestos packing ring 69 and is threaded on its inner surface to accommodate a correspondingly threaded, stainless steel, valve disk 68. When the valve disk 68 is screwed into place in the collar 65, the packing ring 69 is compressed against its seat in the collar to produce an airtight seal. An annular rubber gasket 70 surrounds the tubular support 80 and rests on the top of the collar 65, and a flanged carbon bearing ring 71 rests on the annular gasket 70 with the flange of the bearing ring surrounding the gasket. The bearing ring 71 carries the weight of the rotatable portion of the valve assembly and of the portion of the filtering column depending therefrom. Friction between the bearing ring 71 and the gasket ring 70 and between the gasket ring 70 and the non-rotatable collar 65 prevents rotation of both the gasket ring 70 and the bearing ring 71. The valve disk 68 is pierced by three holes 72 parallel to the axis of the disk and uniformly spaced apart along an arc having its center at the center of the disk. The lower end of each of three stainless steel suction tubes 81, 82, and 83 is soldered, or otherwise rigidly secured, in one of the holes 72. The center of the lower surface of the valve disk 68 is relieved to provide a dome-shaped recess 73 in order to reduce the area of the surface of the disk 68 in sliding contact with an adjacent element of the rotatable portion of the valve assembly.

The rotatable portion of the valve assembly includes the housing 53, the centrally apertured cylindrical block 52 rigidly mounted therein, a centrally apertured cushion disk 74 of rubber or the like, and a centrally apertured graphite flow-directing disk 75. The upper end of the cylindrical block 52 is cupped to receive the cushion disk 74 and the flow-directing disk 75, and these three parts are held against relative rotation by two pins 76 (Fig. 4). A stainless steel tube 77, secured by solder in a seat 78 in the central aperture of the flow-directing disk 75, fits tightly in the neoprene ring 61 with the assistance of pressure exerted by the packing gland 63 and constitutes a liner for the port 57 to protect the cushion disk 74 from contact with liquid flowing through the port. The tube 77 terminates just short of the end of the glass tube 50 so as to avoid metal to glass contact between them. The upper end of the glass tube 50 abuts the neoprene ring 61 adjacent its inner periphery, and the lower end of this tube abuts the rubber ring 48. Pressure contact between the glass tube 50 and the two rings 48 and 61 is brought about when the lower supporting tube 39 is screwed into the intermediate supporting tube 40.

The valve unit 60 is shown in Figs. 4 and 5 in adjusted condition to place the suction tube 50 in communication with the upper suction tube 81 through the port 57, through a passageway 79 in the flow-directing disk 75, and through the hole 72 in which the upper suction tube 81 is mounted in the valve disk 68. By rotating the rotatable portion of the valve unit 60, in a clockwise direction as viewed from above the valve, through an angle equal to half the angular spacing of the holes 72 in the valve disk 68, the upper suction tube 81 is disconnected and the passageway 79 is blocked off by a solid portion of the valve disk. By continuing the rotation in the same direction through another angle equal to half the angular spacing of the holes 72 in the valve disk 68, the suction tube 82 is put in communication with the suction tube 50. A third rotation of the rotatable portion of the valve unit 60, in the same direction and in the same amount, disconnects the suction tube 82, and a fourth such rotation puts the suction tube 83 in communication with the suction tube 50. Further rotation of the rotatable portion of the valve unit 60 in the same direction disconnects the suction tube 83, and, during continued rotation through an arc of roughly 270°, the suction tube 50 is continuously blocked off by the valve disk 68. This feature is desirable for reasons to be explained hereinafter.

Suitable cooperating markers 26 are placed on the top of the valve housing 53 and on the upper supporting tube 80 to indicate the positions in which the tubes 81, 82, and 83 are in communication with the tube 50.

When the filtering columns are in their raised positions and are being transferred from the third tank 7 to positions above the scraper tank 8, the suction tube 83 is in communication with the suction tube 50 so that air is being sucked through the filter cake to evaporate the drying material contained therein. The filter cakes may become sufficiently dry before the filtering columns are lowered to insert their associated filter elements into the scraper tank 8 so that air drafts are apt to blow some of the material away. To guard against such accidental losses, a pair of generally cylindrical glass shields 84 are mounted at their upper edges in collars 85 respectively surrounding the two filtering columns sufficiently loosely so that free sliding contact between the collars and the filtering columns is assured. Each collar 85 includes a supporting plate 86 that is flanged at two opposite ends to form guides 87 (Fig. 3). A track structure supports the collars 85 on the two adjacent filtering columns for sliding movement longitudinally of the receptacle 1 and parallel to the direction of horizontal movement of the two columns. This track structure comprises two outer tracks 88 and an inner double track 89 suitably supported above the receptacle 1 by two outer vertical columns 90 and by an inner vertical column 91 at each end of the tank. The columns 90 and 91 are respectively provided at their lower ends with flanged plates 92 and 93, which are fastened to the end walls of the receptacle 1 by suitable fastening elements 94. The shields 84 may conveniently be mounted in the collars 85 with a suitable ceramic cement 95. When one of the filtering columns is raised, as shown in dotted lines in Fig. 1, the associated thimble filter is drawn up inside the glass shield 84. When the filtering column is moved horizontally from its raised position above one tank to a position above an adjacent tank, the shield supporting collar 85 slides horizontally along and is supported by the tracks 88 and 89 and carries the shield 84 along with the thimble filter to protect the filter cake carried thereby from disturbing air drafts.

Each of the three suction tubes 81, 82, and 83 in the upper supporting tube 80 terminates a short distance above the valve unit 60 in a nipple 96. Rubber hoses 97, 98, and 99, attached to the nipples 96, constitute extensions of these three tubes 81, 82, and 83, respectively, and run through the remaining length of the upper supporting tube 80 and out the upper end thereof. Above the filtering column, the rubber hoses 97, 98, and 99 are supported in any desired manner (not shown) with sufficient slack to permit their lower ends to move horizontally and vertically with the filtering column.

Each of the rubber hoses 97, 98, and 99 leads to a separate source of suction (not shown), which may consist of any conventional type of apparatus adapted to apply suction to a container to draw liquid therethrough and to discharge the liquid into a collection tank. Thus, when the filter element 37 is lowered into the slurry tank 5, and one of the suction lines comprising a rubber hose 97 and a metal tube 81 is put into communication with the filter element through the suction tubes 50 and 45 in the intermediate and lower supporting tubes, filtrate from the slurry contained in this tank is drawn therefrom to a collection tank. Similarly, when the filter element 37 is lowered into the wash tank 6 and the suction line to be associated therewith, comprising a rubber hose 98 and a metal tube 82, is put in communication with the filter element, wash solution is drawn from the wash tank 6 to a collection tank. Similarly, when the filter element 37 is lowered into the drying liquid tank 7, and the suction line to be associated therewith and comprising a rubber hose 99 and a metal tube 83 is put in communication with the filter element, the drying liquid is drawn from drying liquid tank 7 to a collection tank.

Figure 6:
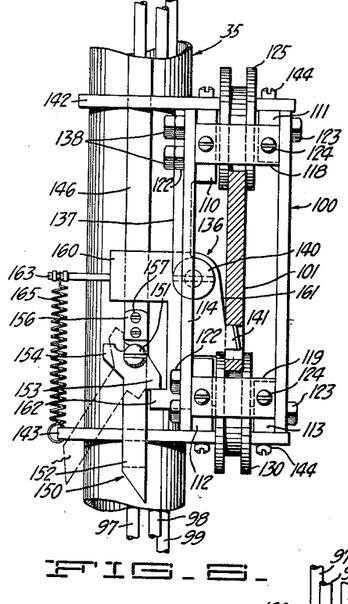
Fig. 6 is an end elevation of the filter supporting structure and filter moving apparatus shown in Fig. 1, partly in section taken along the line 6—6 of Fig. 1.
Figure 7:
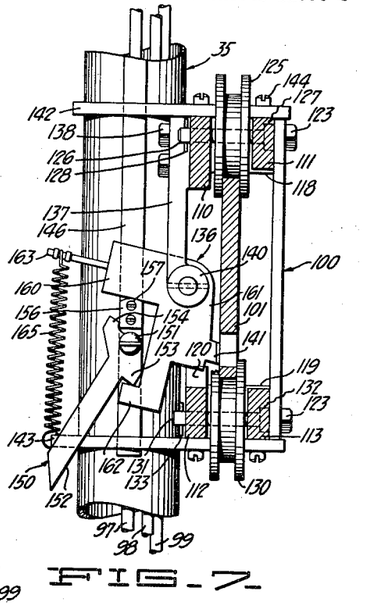
Fig. 7 is a view similar to Fig. 6, but taken along the line 7—7 of Fig. 1, showing the filter supporting and filter moving apparatus in a different position.
Figure 8:
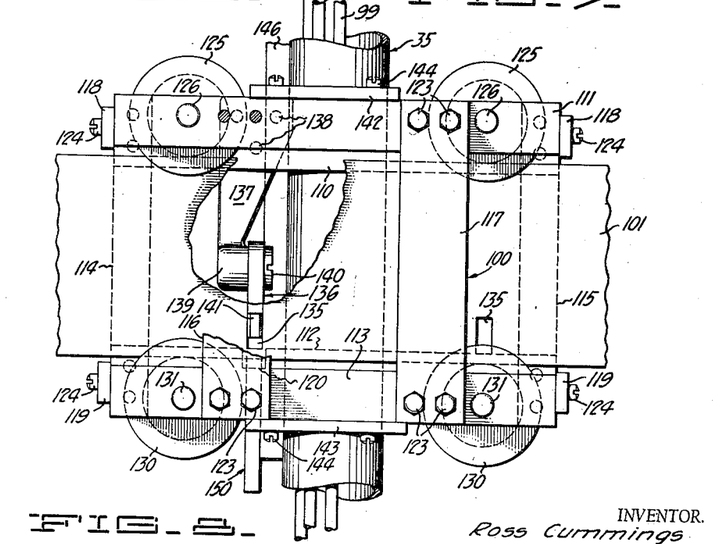
Fig. 8 is a side elevation of the apparatus shown in Fig. 6, with certain parts broken away for clarity.

Referring now to Figs. 6, 7, and 8, the carriage 100, supporting each filtering column to one side thereof, includes a framework comprising a pair of horizontally extending, parallel, upper bars 110 and 111 of rectangular cross section; a pair of horizontally extending, parallel, lower bars 112 and 113 of rectangular cross section; a pair of vertically extending parallel struts 114 and 115 holding the bars 110 and 112 in vertically spaced apart parallel relation and secured thereto by upper and lower pairs of bolts 122; a pair of vertically extending parallel struts 116 and 117 holding the bars 111 and 113 in vertically spaced apart parallel relation and secured thereto by upper and lower pairs of bolts 123; and, at each end of the framework, a pair of short, horizontally extending, upper and lower cross braces 118 and 119, respectively secured to the ends of the upper bars 110 and 111 and to the ends of the lower bars 112 and 113 by cap screws 124. The lower, horizontally extending bar 112 adjacent the filtering column, at a point 120 approximately one-third of its length from its left-hand end as viewed in Fig. 8, is notched to avoid interference with the movement of a pivoted locking arm 136, described hereinafter. A pair of upper, double-flanged wheels 125 are mounted between the struts 110 and 111 adjacent opposite ends of the carriage on horizontal shafts 126. These shafts 126 are secured in place by a round head 127 on one end of each shaft, which heads are counter-sunk into one of the upper bars 111, and by a cotter pin 128 at the opposite end of each shaft. The carriage is also provided with lower, double-flanged wheels 130 mounted adjacent opposite ends of the carriage between the struts 112 and 113 on shafts 131 secured in place by counter-sunk heads 132 and cotter pins 133. The upper wheels 126 ride upon the upper edge of the associated track 101 with their flanges straddling the track, and the lower wheels 130 similarly ride upon the lower edge of the track 101.

The track 101 is pierced at equally spaced apart intervals with four rectangular holes 135, and the carriage is provided with a pivoted locking arm 136 having a stop 141 adapted successively to project into the holes 135 in the track 101 to lock the carriage in aligned positions above the four tanks 5, 6, 7, and 8. The pivoted locking arm 136 is mounted on the carriage for movement about a horizontal axis by means of a support 137 fastened to one of the bars 110 by bolts 138 and having a boss 139 at its lower end, and by means of a screw 140 which projects through the locking arm 136 and threadedly engages the boss 139. Upper and lower plates 142 and 143 are respectively secured to the upper bars 110 and 111 and to the lower bars 112 and 113 by cap screws 144 and project laterally beyond the carriage to provide a mounting for the upper supporting tube 80 of the associated filtering column 35. The upper supporting tube 80 is provided with a rib 146 of rectangular cross section which runs longitudinally of the upper supporting tube 80 and is secured thereto in any suitable manner, as by counter-sunk screws (not shown). A split collar 147 (Fig. 1) surrounds the upper supporting tube 80 and is provided with flanges 148 on opposite sides of the rib 146, which may be urged together by a bolt 149. The collar 147 is thereby securely clamped in position around the upper supporting tube 80 at a point thereon immediately above and adjacent the upper mounting plate 142 when the filtering column 35 is in its extreme lower position. The mounting plates 142 and 143 have holes therethrough which accommodate for free-sliding vertical movement the supporting tube 80 and its rib 146. When the filtering column 35 is in its extreme lower position, the split collar 147 rests on the upper mounting plate 142 and functions as a stop to prevent further downward movement of the column.

A latch 150 is pivotally mounted on the rib 146 of the upper supporting tube 80 adjacent the lower end of the rib by means of a screw 151 which passes loosely through the latch 150 and is threaded into the rib 146. The latch 150 consists of a handle portion 152 and two projecting stops 153 and 154, most clearly shown in Fig. 7. The rib 146 is provided with a lug 156 secured by means of screws 157 to the rib 146 at a point slightly above the screw 151 on which the latch 150 is mounted.

The pivoted locking arm 136 is substantially L-shaped and comprises a generally horizontal leg 160 and a generally vertical leg 161 having a projection 162 at its lower end. A rod 163 extends laterally from the horizontal leg 160, and one end of a coil spring 165 is attached thereto. The other end of the spring 165 is secured to the lower mounting plate 143. This spring urges the pivoted locking arm 136 in a counterclockwise direction as viewed in Figs. 6 and 7, whereby the stop 141 will be moved into one of the holes 135 in the track 101 when the carriage 100 is aligned above one of the tanks 5, 6, 7 or 8.

When the carriage 100 is in the position shown in solid lines in Fig. 1, the projection 141 of the pivoted locking arm 136 on the carriage 100 extends into the first hole 135 in the track 101, thereby locking the carriage against movement in a horizontal direction to prevent movement of the filter element 37 into contact with the end wall or partition wall of the slurry tank 5. When it is desired to move the filter element 37 from the slurry tank 5 into the wash tank 6, the operator grasps the filtering columne 35 and raises it vertically until the lug 156 on the rib 146 of the supporting tube 80 engages the lower edge of the horizontal leg 160 of the pivoted locking arm 136 and moves it in a clockwise direction, as viewed in Figs. 6 and 7, to the position shown in Fig. 7. During upward travel of the supporting tube 80, the stop 153 of the latch 150 contacts the lower edge of the projection 162 on the pivoted locking arm 136 and acts as a cam to swing the latch 150 in a clockwise direction, as viewed in Fig. 6, to the position shown therein in dotted lines, thereby permitting the latch 150 to pass by the projection 162 and come to rest in the position shown in Fig. 7. If the filtering column 35 is then permitted by the operator to drop downwardly, the coil spring causes the pivoted locking arm 136 to rotate counterclockwise into the position shown in Fig. 6 with its stop 141 again extending through the first hole 135 in the track 101, and with the latch 150 swung back into the position shown in solid lines in Fig. 6, whereby further downward movement and horizontal movement of the filtering column 35 will both be prevented. To move the filtering column 35 horizontally from its position above the slurry tank 5 to its position above the wash tank 6, the operator again lifts the filtering column 35 until the lug 156 on the rib 146 engages the leg 160 of the pivoted locking arm 136 to rotate it clockwise as viewed in Figs. 6 and 7 and withdraw the stop 141 from the first hole 135 of the track 101. This frees the carriage for horizontal movement to a position above the wash tank 6. Of course, on raising the filtering column out of the slurry tank 5 to its extreme upper position, and while manually supporting the column with the lug 156 bearing against the lower edge of the leg 160 of the locking arm 136 to hold the stop 141 out of the adjacent hole 135, the operator may at once move the column and its supporting carriage horizontally from its position above tank 5 to its position above tank 6. As soon as the stop 141 has been moved out of line with the first hole 135, the column 35 should no longer be manually supported. During horizontal travel of the carriage, the stop 141 bears against the side of the track 101 and holds the pivoted locking arm 136 in the position shown in Fig. 7, and the stop 153 of the latch 150 rests upon the projection 162 of the pivoted locking arm 136, thereby preventing lowering of the filtering column 35. When the stop 141 snaps into the next hole 135 in the track 101, thereby locating the carriage 100 above the wash tank 6, the latch 150 is forced by the weight of the filtering column 35 back into the position shown by solid lines in Fig. 6. In order to lower the filtering column 35 to drop the thimble filter 37 into the wash tank 6, the arm 152 of the latch 150 is manually moved to the position shown by dotted lines in Fig. 6, thereby permitting the stop 153 on the latch 150 to slide downwardly past the projection 162 on the pivoted locking arm 136 and permitting the filtering column 35 to be lowered freely to its next operative position. In order to prevent the weight of the filtering column from causing it to descend too rapidly, and in order to facilitate raising the filtering column, counterweights (not shown) and a suitable system of ropes and pulleys (not shown) may be employed to carry a substantial portion, but not all, of the weight of the filtering column.

Figure 9:
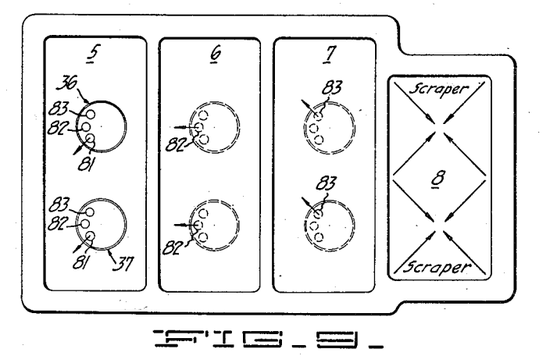
Fig. 9 is a schematic plan view of the tanks of Figs. 1, 2, and 3 showing the various sequential positions of the thimble filters during the steps of filtering, washing, and drying and showing the sequence in which suction is applied to suction lines connected to the thimble filters.

Now, considering in detail the operation of the apparatus described above, it will be convenient to refer also to Fig. 9, which is a schematic plan view of the series of tanks and which shows the four successive positions that the thimble filters 36 and 37 occupy in the four tanks 5, 6, 7, and 8 and the relation between the operation of the three suction tubes 81, 82, and 83 and the first three positions of the filters.

With both of the filter elements 36 and 37 and their supporting columns 34 and 35 held in raised positions above the wash tank 5, and with their respective carriages 100 locked as shown in Fig. 6 to prevent either horizontal or vertical movement of the filtering columns, the first three tanks 5, 6, and 7 are respectively charged through the conduits 15 and the openings 14 in the tank walls with a slurry to be filtered, a wash solution, and a drying liquid. While grasping the filtering column 35 to control its descent, the operator manually moves the handle 152 of the latch 150 from the position shown in solid lines in Fig. 6 to the position shown in dotted lines in that figure, thereby permitting the filtering column 35 to be lowered until the collar 147 thereon contacts the plate 142 of the carriage 100 and acts as a stop to prevent further downward movement. When the column 35 is in this lowered position, the filter element 37 is suspended in the slurry tank 5, as shown in detail in Fig. 1 and schematically in Fig. 9. The valve housing 53 of the valve unit 60 is then manually rotated (clockwise as viewed from above) to a position in which one of the suction tubes 81 is in communication with the tube 50, whereby filtrate in the slurry tank 5 is drawn through the filter element 37, through the associated suction tubes 45, 50, 81, and 97 and into a collection tank (not shown), and the solid material in the slurry is caused to build up as a filter cake on the filter element 37. This condition is represented in Fig. 9 by the arrows in the wash tank 5. When the filter cake has built up to the desired thickness, the valve housing 53 is rotated in the same direction as before to a position such that the passageway 79 in the flow-directing disk 75 is blocked by a solid portion of the valve disk 68 between the hole 72 in which one of the tubes 81 is mounted and the next adjacent hole 72 in which an adjacent tube 82 is mounted, thereby cutting off the tube 50 from communication with the tube 81. The filtering column is then raised until the stop 153 on the latch 150 is cammed around the projection 162 on the pivoted locking arm 136 and arrives in the position shown in Fig. 6 to lock the filtering column against downward movement. If there is any dripping of filtrate from the thimble filter, it is desirable to permit the filtering column to remain in this position above the slurry tank 5 until the dripping has ceased.

The filtering column 35 is next manually raised (through a distance of the order of one inch) to its extreme upper position in which the lug 156 on the filtering column contacts the horizontal leg 160 of the pivoted locking arm 136, causing it to rotate clockwise as viewed in Fig. 7 to the position shown therein, whereby the stop 141 on the pivoted locking arm 136 is withdrawn from the adjacent hole 135 in the track 101. While holding the filtering column in this extreme upper position, the column is moved horizontally to the right a sufficient distance so that the stop 141 cannot fall back into the hole 135 from which it was just withdrawn. The operator may then permit the column 35 to drop downwardly (again a distance of the order of one inch) until its motion is arrested and it is supported by contact of the projection 153 on the latch 150 with the projection 162 on the pivoted locking arm 136, at which point further downward movement of the column 35 is prevented; and movement of the filtering column to the right is continued until the stop 141 on the pivoted locking arm 136 snaps into the hole 135 in the track 101 corresponding to the next desired position of the filtering column above the wash tank 6. When the stop 141 snaps into this hole 135, the column 35 is permitted to drop from the position shown in Fig. 7 to the position shown in Fig. 6. The latch 150 is then manipulated again, as described above, for the purpose of lowering the filter element 37 into the wash tank 6; the valve housing 53 is rotated to bring a second suction tube 82 into communication with the filter element 37 to cause wash solution in the wash tank 6 to be sucked through the filter cake, through the filter element 37, through the associated suction tubes 45, 50, 82, and 98; and into a collection tank (not shown). This condition is represented in Fig. 9 by the arrows in the wash tank 6. Wash solution is permitted to be drawn through the filter cake on the filter element 37 for a sufficient time to wash the filter cake substantially completely free from residual filtrate retained therein when the filter element 37 was withdrawn from tank 5. The valve housing 53 is then rotated as before so that the passageway 79 in the flow-directing disk 75 is blocked off by a solid portion of the valve disk 88 between the holes 72 in which the adjacent suction tubes 82 and 83 are mounted, and the filtering column is again raised to the locked position shown in Fig. 6 to raise the filter element 37 out of the wash tank 6.

After any dripping into the wash tank has ceased, the filtering column 35 is again raised to its extreme upper position to free it for movement horizontally to a locked position above the drying liquid tank 7. The procedure hereinbefore described is again repeated in order to lower the filter element 37 into the drying liquid tank 7; the valve housing 53 is rotated to bring the third suction tube 83 in communication with the filter element 37, whereby drying liquid is drawn through the filter cake, through the filter element 37, through the associated suction tubes 45, 50, 83, and 99, and into a collection tank (not shown); and the drawing of drying liquid through the filter cake is continued until all of the residual wash solution retained in the filter cake when the filter element 37 was withdrawn from the wash tank 6 has been washed from the filter cake. This condition is represented in Fig. 9 by the arrows in the drying liquid tank 7. If a drying liquid of the nature of methanol is employed, its affinity for water assists materially in reducing the time required to displace residual wash solution in the filter cake.

While the third suction tube 83 is still in communication with the filter element 37 and drying liquid is being drawn through the filter cake on the filter element, the filtering column 35 is again raised to its extreme upper position and moved horizontally to the right as viewed in Fig. 1 to its position above the scraper mechanism in the scraper tank 8, with the stop 141 on the pivoted locking arm 136 positioned in the last hole 135 in the track 101 and with the latch 150 supporting the filtering column 35 against downward movement. From the moment the filter element 37 is withdrawn from the drying liquid in tank 7, air, instead of drying liquid, is sucked through the filter cake and through the filter element and is exhausted through the associated suction tubes 45, 50, 83, and 99, carrying with it drying liquid vapor and effectively preventing dripping from the thimble filter.

When sufficient air has been sucked through the filter cake to remove all of the drying liquid therefrom, the valve housing 53 is rotated as before to block off the passageway 79 in the flow-directing disk 75 by a solid portion of the valve disk 68 beyond the hole 72 in which the third suction tube 83 is mounted, thereby cutting off the flow of air through the filter cake. The filtering column 35 is then lowered until the filter cake on the filter element 37 contacts the aligned scraper blades 31. By additional rotation of the valve housing 53, the filter element 37 is caused to rotate, and the filter cake is scraped therefrom by the scraper blades 31 and falls through the outlet 9 therebelow. The arrangement of the holes 72 in the valve disk 68 of the valve unit 60 along an arch which, in this instance, subtends an angle of only about 90°, leaves more than a sufficient arc through which the valve housing 53 and the filter element 37 may be rotated to scrape a filter cake from the filter element without connecting the valve port 57 with any of the other port (holes 72) of the valve unit.

The filtering column 35 is then again raised to its extreme upper position and held with the lug 156 contacting the leg 160 of the pivoted locking arm 136, to hold the latter in the position shown in Fig. 7, while the filtering column is moved horizontally back to its initial position as shown in Fig. 1 for repetition of the cycle described.

When operated in accordance with the foregoing description, the two filtering columns 34 and 35 merely constitute a plurality of units identical in construction and function. Both columns are operated together in the same manner for doubling the filtering capacity obtainable with a single filtering column. Obviously, the number of independent filtering columns could be multiplied as desired for operation in association with a single enlarged receptable, or in association with a plurality of such receptacles, each designed to accommodate one or more filtering units.

While I have shown the four tanks 5, 6, 7, and 8 as units of a single large receptacle 1, in order to eliminate cracks or spaces between the tanks in which liquid or solid material dropping from the thimble filters could become lodged, it is also obvious that the operation of the filtering units is in no manner dependent upon this particular arrangement of tanks and that the four tanks 5, 6, 7, and 8 could be constructed and arranged in a variety of ways. In the following claims, the term "tanks" is intended to be employed in a generic sense to include a plurality of independent containers as well as a plurality of compartments in a single receptacle.

Figure 10:
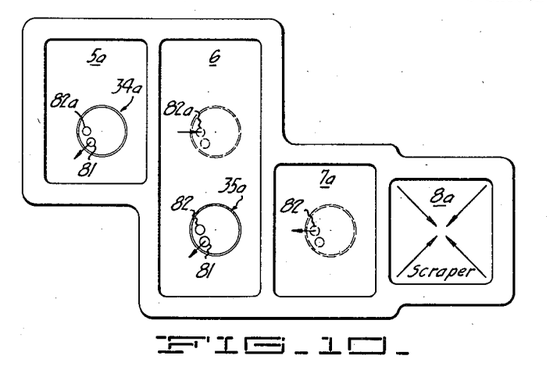
Fig. 10 is a view similar to Fig. 9 but shows how the tank and the use of suction lines may be modified for employing the apparatus according to a different system of operation.

By suitable modification of the tank, valve, and suction tube arrangements, the filtering units described above may be employed in any of a variety of ways as may be required by the particular material to be filtered. In Fig. 10, there is schematically illustrated a modified arrangement adapted for use when it is desired to re-slurry the precipitate in the wash tank 6 for more complete separation of residual filtrate retained by the filter cake at the conclusion of the filtration step in the slurry tank 5a. In this embodiment of the invention, the filtering column 34 of the embodiment previously described is employed with only slight structural change. One of the suction tubes 82 in the first embodiment, instead of being employed as a suction tube, serves as a positive pressure tube 82a for feeding either air, inert gas, or liquid wash solution to the thimble filter 36, supplied from any convenient source (not shown); and the third suction tube 83 and the corresponding hole 72 in the valve disk 68, in which the third suction tube 83 was mounted, are eliminated. The filtering column 35a differs structurally from the filtering column 35 of the embodiment previously described only in that this third suction tube 83, the associated rubber hose 99, and the hole 72 of the disk 68, in which this suction tube 83 was mounted, are eliminated.

In the embodiment of the invention represented by Fig. 10, the filtering column 34a is employed only in the slurry and wash tanks 5a and 6, and the filtering column 35a is employed only in the wash, drying liquid, and scraper tanks 6, 7a, and 8a. Consequently, the slurry and drying liquid tanks 5a and 7a may be made smaller than the corresponding tanks 5 and 7 in the previous embodiment in order to reduce the volume of liquid required to carry out the filtration step and the drying step, and the scraper tank 8a, containing only a single set of scraper blades, may be similarly reduced in size, as shown. The tank 6 is identical with the corresponding tank 6 in the embodiment previously described. The tracks on which the two filtering columns and their supporting carriages are mounted may, if desired, be shortened to restrict the horizontal movement of the filtering columns to the paths which they must travel in order to cooperate with the tanks with which they are respectively to be associated. The stirring mechanism of the previous embodiment may most conveniently be modified in the present embodiment by merely eliminating the stirrer blade 16 formerly employed in the wash tank 7, and the associated shaft and gear mechanism as well. The filter element 36 mounted for insertion into the slurry and wash tanks 5a and 6 is not adapted in this embodiment of the invention to carry a filter cake beyond the wash tank 6, and the associated shield 84, therefore, may be omitted from the filtering column 34a supporting this filter element, and the shield supporting elements may be suitably modified and simplified as desired for cooperating only with the shield on the adjacent filtering column 35a.

In operating the apparatus in accordance with the embodiment of the invention schematically represented by Fig. 10, the two filtering columns 34a and 35a no longer merely constitute a plurality of units identical in construction and function, but cooperate in a single filtering, washing, drying, and scraping cycle. With one of the filtering columns 34a in raised position above the slurry tank 5a and with the other filtering column 35a in raised position above the wash tank 6, the appropriate tanks 5a, 6, and 7a are charged with a slurry to be filtered, a wash solution, and a drying liquid, respectively. The filter element 36 on the filtering column 34a above slurry tank 5a is first lowered into that tank. The associated valve unit 60 is then manipulated, as hereinbefore described, to place the suction tube 81 in communication with the interior of the filter element 36 to cause a filter cake to be loaded upon the filter element. This condition is represented in Fig. 10 by the arrow in the slurry tank 5a.

After a filter cake of the desired thickness has been collected, the valve unit 60 is manipulated to disconnect the suction tube 81, and the filtering column 34a is raised, moved horizontally to a position above the wash tank 6, and lowered into that tank. The associated valve unit 60 is then manipulated to place the positive pressure tube 82a in communication with the interior of the filter element 36a, whereby the selected type of fluid to be supplied by the positive pressure tube passes through the associated tubes 50 and 45 into the filter element 36 and through the walls of the filter element and into suspension in the wash solution. This condition is represented in Fig. 10 by the arrow in the wash tank 6 pointing into the filtering column 34a. The stirring mechanism in the wash tank 6 provides sufficient agitation to keep the discharged precipitate in suspension in the wash solution until it can be picked up again on the filter element 37 of the other filtering column 35a in a manner to be described. After the filter element 36 has deposited its load into the wash tank 6, the valve unit 60 is manipulated to block off the positive pressure tube 82a from communication with the associated filter element 36 to cut off the flow of fluid therethrough, and the first filtering column 34a is raised and returned horizontally to its initial position above the wash tank 5a ready for the next cycle.

The second filtering column 35a is then lowered into the wash tank 6 and the associated valve unit 60 is manipulated to place one of the suction tubes 81 in this filtering column in communication with the interior of the associated filter element 37, whereby suction is applied to the interior of this filter element to draw wash solution therethrough and to build up a filter cake on the outside of the filter element. This condition is represented in Fig. 10 by the arrow in the wash tank 6 pointing away from the filtering column 35a. When a cake of the desired thickness has accumulated, the valve housing 53 on the second filtering column 35a is rotated to a position such that the passageway 79 in the associated flow-directing disk 75 is blocked by a solid portion of the adjacent valve disk 68, thereby cutting off the application of suction. The second filtering column 35a is then raised until the stop 153 on the associated latch 150 arrives in position to bear upon the upper edge of the projection 162 on the cooperating pivoted locking arm 136 and to prevent downward movement of the filtering column. After this filtering column has remained in its raised position above the wash tank 6 long enough for any dripping of wash solution from the filter element 37 to cease, the filtering column is manipulated to move it horizontally to a position above the drying liquid tank 7a and is then lowered to insert the filter element 37 into this tank. The associated valve unit 60 is manipulated to place a second suction tube 82 in communication with the interior of the filter element 37 to suck drying liquid through the filter cake and through the filter element and to exhaust the same through the connected suction tube 82 and ultimately into a collection tank (not shown). This condition is represented in Fig. 10 by the arrow in the drying liquid tank 7a. Drying liquid is permitted to be drawn through the filter cake for a sufficient time to wash it substantially completely free from residual wash solution.

While the last mentioned suction tube 82 is still in communication with the interior of the filter element 37 and drying liquid is being drawn through the filter cake thereon, the filtering column 35a is again raised to its extreme upper position and moved horizontally to the right to a position above the scraper mechanism in the scraper tank 8a. The valve unit 60 is manipulated in the usual manner to cut off the tube 82 from communication with the interior of the filter element 37 after sufficient air has been sucked through the filter cake to remove substantially all of the drying liquid therefrom and to leave the filter cake in a dry condition.

The filtering column 35a is then lowered until the filter cake on the filter element 37 contacts the scraper blades 31 in the scraper tank 8a. By additional rotation of the valve housing 53, the filter element 37 is caused to rotate and the filter cake is scraped therefrom by the scraper blades 31 and falls through the outlet 9 therebelow. After removal of the filter cake from the filter element 37, the filtering column 35a is raised to its extreme upper position and moved horizontally back to its initial position above the wash tank 6 for operation as described above in the succeeding cycle.

When operating in accordance with this embodiment of the invention, it is apparent that a substantial amount of precipitate must be held up in the wash tank 6 by reason of the inability of the filter element 37 on the second filtering column 35a completely to remove it. Each time the filter element 36 on the first filtering column 34a discharges the filter cake picked up by it in the slurry tank 5a, sufficient additional precipitate is added to that remaining from the previous cycle to permit the filter element 37 on the second filtering column 35a to pick up a cake of normal size. The disadvantage of having a holdup of precipitate in the wash tank 6 and two filtering columns instead of one to carry out a single cycle of operation must be weighed against the advantage resulting from the greater washing efficiency obtained by reslurrying the precipitate from one filter element to another filter element in the wash solution in order to determine whether or not the present embodiment of the invention is to be preferred for a particular type of service. It should also be noted that the amount of wash solution initially charged into the wash tank 6 should be such that the addition of wash solution through a filter element to discharge into the wash tank 6 the cake picked up from the slurry in the slurry tank 5a (when wash solution rather than a gas is used for this purpose) does not cause the wash tank 6 to overflow.

Figure 11:
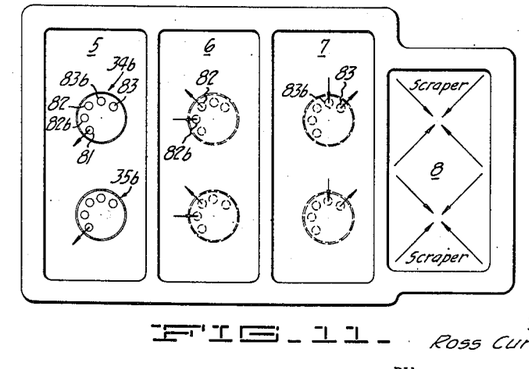
Fig. 11 is a view similar to Fig. 9 but shows how the tank, the suction tubes, and the use of the suction tubes may be modified for employing the apparatus according to still another system of operation.

In Fig. 11, there is schematically illustrated another modified arrangement adapted for use when it is desired to reslurry the precipitate in either or both of the wash solution and drying liquid tanks. For this embodiment of the invention, the only structural changes required in the apparatus employed in the embodiment represented by Fig. 9 involve incorporating two additional tubes within the upper tubular support 80 of each filtering column 34b and 35b. In accordance with this embodiment of the invention, the two filtering columns again merely constitute a plurality of units identical in construction and function for doubling the capacity that can be obtained with but a single filtering column. To avoid unnecessary repetition, therefore, only the construction and operation of one of the filtering columns 34b will be described, it being understood that the construction and operation of the other filtering column 35b, and of any additional filtering columns which may desirably be added to the arrangement, merely duplicate the construction and operation of filtering column 34b.

Referring to filtering column 34b, three suction tubes 81, 82, and 83 and two positive pressure tubes 82b and 83b for supplying fluid under pressure are contained in the upper supporting tube 80 in the relative positions shown in Fig. 11. The valve disk 68, previously described, is modified merely by the provision of two additional holes 72, positioned to accommodate the two additional tubes, and the lower ends of the five tubes are respectively soldered or otherwise rigidly secured in the five holes 72. The three suction tubes 81, 82, and 83, communicating with suitable sources of suction as before, are adapted to draw filtrate, wash solution, and drying liquid, respectively, through the thimble filter 36 and to discharge them respectively into collection tanks (not shown). The tube 82b serves as a supply line for feeding under pressure air, inert gas, or wash solution, to the filter element 36, and the tube 83b serves as a supply line for feeding under pressure air, inert gas, or drying liquid to the filter element.

While the filtering column 34b is in its locked position above the slurry tank 5, the appropriate tanks 5, 6, and 7 are respectively charged as before with slurry, wash solution, and drying liquid. In this instance, a smaller amount of wash solution may be put into the wash tank 6, and a smaller amount of drying liquid may be put into the drying liquid tank 7 than in the first embodiment described herein, depending upon whether liquid or gas is to be supplied to these tanks from the positive pressure tubes 82b and 83b, respectively, during the cycle to be described.

The filtering column 34b is first lowered into the slurry tank 5, and the valve unit 60 is manipulated to place one of the suction tubes 81 into communication with the interior of the filter element 36, whereby a filter cake is loaded upon the filter element as filtrate is drawn therethrough and is ultimately discharged into a receiving tank (not shown). This condition is represented in Fig. 11 by the arrows in the slurry tank 5. When a filter cake of the desired thickness has accumulated on the filter element 36, the valve unit 60 is manipulated to cut off the first suction tube 81 from communication with the interior of the filter element and the filtering column 34b is returned to its locked raised position above the slurry tank 5.

When dripping from the filter element into the slurry tank 5 has ceased, the filtering column 34b is moved horizontally to its position above the wash tank 6 and is lowered to insert the filter element 36 into this tank. The valve unit 60 is then manipulated to place one of the positive pressure tubes 82b in communication with the interior of the filter element, whereby the selected fluid for the purpose is supplied under pressure to the interior of the filter element to discharge the filter cake therefrom and cause the precipitate to be reslurried in the wash tank 6. This condition is represented in Fig. 11 by the arrows in the wash tank 6 pointing into the filtering columns. With the filter element 36 still in the wash tank 6, the valve unit 60 is again manipulated to place a second suction tube 82 into communication with the interior of the filter element 36, whereby wash solution is drawn through the filter element and ultimately discharged into a receiving tank (not shown) and a second filter cake is loaded upon the filter element. This condition is represented in Fig. 11 by the arrows in the wash tank 6 pointing away from the filtering columns. The filtering column 34b is then returned to its locked raised position above the wash tank 6.

After dripping from the filter element 36 into the wash tank 6 has ceased, the filtering column 34b is moved horizontally to its position above the drying liquid tank 7 and is lowered to insert the filter element 36 into this tank, at which time the valve unit 60 is manipulated to place the second positive pressure tube 83b in communication with the interior of the filter element 36 to force the selected fluid under pressure through the filter element and to discharge the filter cake and reslurry it in the drying liquid tank 7. This condition is represented in Fig. 11 by the arrows in the drying liquid tank 7 pointing into the filtering columns. The valve unit 60 is then manipulated to place the third suction tube 83 in communication with the interior of the filter element 36, whereby drying liquid is drawn through the filter element and ultimately discharged into a receiving tank (not shown), and a filter cake is again caused to be loaded upon the filter element. This condition is represented in Fig. 11 by the arrows in the drying liquid tank 7 pointing away from the filtering colums. With the third suction tube 83 still in communication with the interior of the filter element 36, the filtering column 34b is raised and moved horizontally to its next locked position above the scraper tank 8, whereby air is drawn through the filter cake to carry off all of the drying liquid retained thereby to leave the filter cake in a dry condition.

The filtering column 34b is then lowered until the filter cake on the filter element 36 contacts the scraper blades 31 in this tank. By additional rotation of the valve housing 53, the filter element 36 is caused to rotate, and the filter cake is scraped therefrom by the scraper blades 31 and falls through the outlet 9 therebelow.

While the arrangement of the five holes 72 in the valve disk 68 of the valve unit 60 to accommodate the five tubes housed within the upper tubular support 80 requires that they be spaced around the valve disk 68 over a substantially larger arc than in the first embodiment disclosed herein, there is still sufficient space to allow more than the approximately 90° of rotation of the valve housing 53 required to remove a filter cake from the filter element without placing any of the suction or positive pressure tubes in communication with the interior of the filter element.

It is obvious that one of the positive pressure tubes 82b or 83b, and its associated hole 72 in the valve disk 68, may be eliminated from each filter column in order to eliminate one of the reslurrying operations, in which case the apparatus is adapted alone to perform simultaneously two cycles similar to the one cycle performed by the apparatus represented by Fig. 10.

As is the case when employing the reslurrying operation described in connection with the embodiment represented by Fig. 10, the reslurrying operations just described necessitate a hold-up of precipitate in the wash and drying liquid tanks 6 and 7 because of the inability of the filter elements to remove all of the precipitate suspended in the liquids contained in these tanks. In each instance the additional precipitate added to that left in a tank during a preceding cycle of operation is sufficient to enable the filter elements again to pick up from that tank a filter cake of normal thickness. As before, the hold-up of precipitate is a disadvantage to be weighed against the advantages of reslurrying to obtain more efficient washing of the precipitate. With the embodiment represented by Fig. 11, however, it is possible to employ a reslurrying type of operation in which only a single filtering column is required to complete a full cycle. Thus the embodiment represented by Fig. 11 is more economical as to apparatus required than that represented by Fig. 10.

Figure 12:
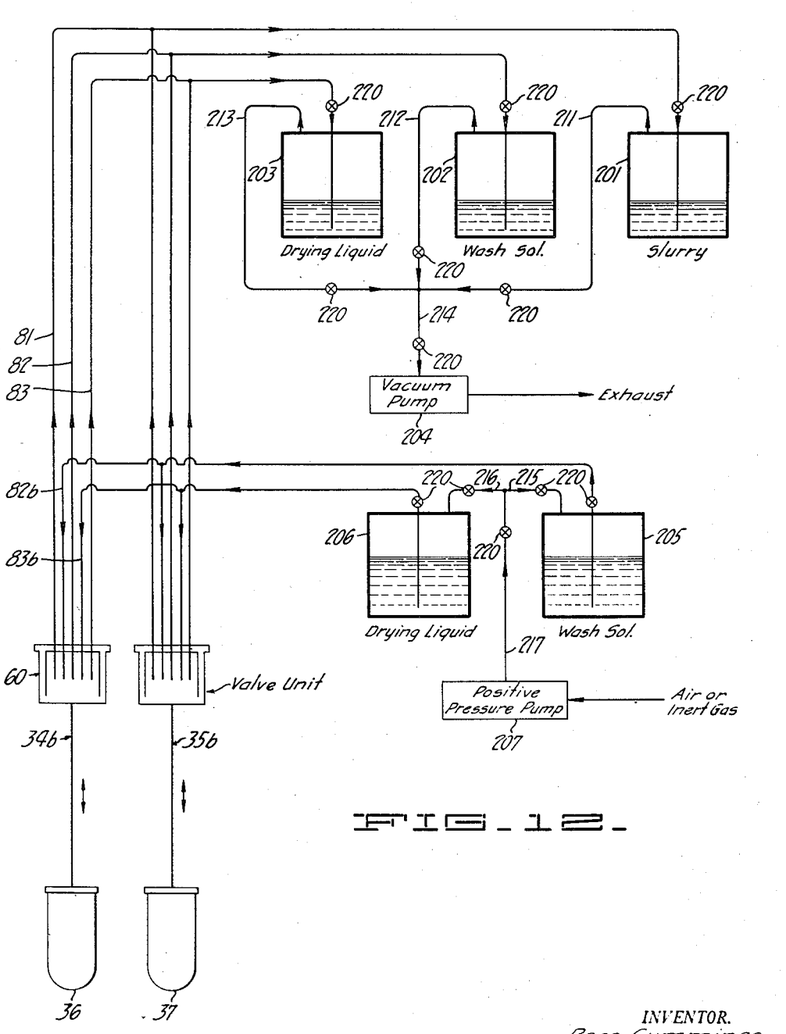
Fig. 12 shows a schematic partial plant diagram for the embodiment of the invention represented by Fig. 11, including suction and positive pressure systems adapted for cooperative association with a pair of filter elements.

In order to illustrate how suction and pressure may be applied to the appropriate pressure differential conduits which are adapted to be placed in communication with the interior of the hollow filter elements for operation according to each of the three embodiments of the present invention, there is shown in Fig. 12 a flow diagram particularly designed for the third embodiment of the invention represented by Fig. 11. Since the embodiments of the invention represented by Figs. 9 and 10 employ a simpler arrangement of pressure differential conduits than the embodiment of the invention represented by Fig. 11, adaptation of the arrangement of suction and pressure equipment for the simpler embodiments of the invention involves merely a selection of the necessary portions of the arrangement shown in Fig. 12.

In the embodiment of the invention represented by Fig. 11, each of the filtering columns 34b and 35b includes five pressure differential conduits, three of which 81, 82, and 83, are sequentially employed in conjunction with suitable sources of suction for drawing liquid through the associated filter element into separate collection tanks, and two of which, 82b and 83b, are respectively employed in conjunction with fluid reservoirs and a positive pressure pump to force a suitable fluid (gas or liquid) into the interior of the associated filter element and outwardly through the walls thereof into the wash tank 6 and the drying liquid tank 7. In Fig. 12, the two filtering columns 34b and 35b are shown diagrammatically, with the respectively associated filter elements 36 and 37 communicating with separate valve units 60 and with the five pressure differential conduits 81, 82b, 82, 83b, and 83 of each filtering column leading away from the associated valve unit. The suction conduits 81, 82, and 83 respectively lead into collection tanks 201, 202, and 203, and extend downwardly therein to points near the bottoms thereof. These collection tanks should be airtight so that a partial vacuum may be maintained therein above the level of the liquid collected therein. Three suction conduits 211, 212, and 213, communicating respectively with the collection tanks 201, 202, and 203 through the tops thereof, lead to a suction manifold 214, which is in turn connected with a vacuum pump 204. With this arrangement the vacuum pump 204 serves to maintain a partial vacuum in the tanks 201, 202, and 203 so that when one of the valve units 60 is manipulated to place a selected suction conduit 81, 82, or 83 in communication with the interior of an associated filter element 36 or 37 in one of the three liquid containing tanks 5, 6, and 7, liquid surrounding the filter element is drawn therethrough and into the tank 201, 202, or 203 to which the selected suction conduit is connected. Similarly the positive pressure conduits 82b and 83b lead respectively to pressure tanks 205 and 206. Depending upon whether air, inert gas, or a suitable liquid is to be forced through the filter elements when they are in the wash tank 6 and the drying liquid tank 7 to unload filter cakes therefrom, the pressure tanks 205 and 206 may contain either air, inert gas, or liquid. Assuming that wash solution is to be forced through the filter elements when they are in the wash tank 6 and drying liquid is to be forced through the filter elements when they are in the drying liquid tank 7, the tank 205 will contain wash solution and the tank 206 will contain drying liquid in quantity sufficient to supply the requirements of operation of the apparatus, but sufficiently limited to leave an air space above the liquid level in each pressure tank. Positive pressure conduits 215 and 216, communicating respectively with the two pressure tanks 205 and 206 through the tops thereof, lead to a pressure manifold 217 which is in turn connected to a positive pressure pump 207 adapted to pump air or inert gas through the pressure manifold 217 and the pressure conduits 215 and 216 to maintain a positive pressure above the liquid level in each of the pressure tanks 205 and 206. When a selected positive pressure conduit 82b or 83b is placed in communication with the interior of an associated filter element by manipulation of the associated valve unit 60, liquid is forced from the associated tank 205 or 206, as the case may be, through the selected positive pressure conduit and ultimately into the interior of the associated filter element 36 or 37 and outwardly through the walls thereof. Conventional valves 220 may be placed at various points in the suction and pressure lines described above in order that any part of the system may be isolated at will.

For the purpose of demonstrating the particular utility of the apparatus disclosed herein, reference is made to the copending application of Robert Q. Boyer, Serial No. 577,380, filed February 12, 1945. In that application, there is disclosed a complete plant process for treating a "calutron wash solution" containing uranium enriched with the $U^{235}$ isotope to recover, with negligible losses to the outside, all of the uranium contained in the solution. By the term "calutron" is meant an apparatus having as its basic components a vacuum chamber, electrodes for accelerating ions, an ion source, a magnetic field to bend the trajectory of the ions, and a collector for capturing and retaining the ions. The wash solution of the calutron is the solution resulting from washing the surfaces thereof for the purpose of removing materials deposited therein during operation thereof. In the process described in that application, there is produced a slurry of uranous oxalate consisting of as the precipitate suspended in a 1 N to 3 N hydrochloric acid solution containing ions of $Fe^{++}$, $Cr^{+++}$, $Ni^{++}$, $Cu^{++}$, and perhaps a trace of $U^{++++}$, and un-ionized $H_2C_2O_4$. It is necessary that the precipitate of be separated from positive metal ions by filtration and washing, and, since the uranium in the precipitate is enriched with $U^{235}$, which it is the entire object of the process to recover without loss, the exercise of extreme care in the separation procedure is absolutely necessary.

In handling the slurry described above in accordance with the Boyer application referred to, the filter cake built up on a filter element is washed with an approximately 0.2 molar solution of oxalic acid in about 1 N hydrochloric acid heated to a temperature of approximately 60° C., whereby any $Fe^{++}$, $Cr^{+++}$, $Ni^{++}$, $Cu^{++}$, and $U^{++++}$ ions occluded by the filter cake are washed away. Following the oxalic acid wash, substantially anhydrous methyl or ethyl alcohol (preferably the former)

is percolated through the filter cake for the purpose of displacing residual oxalic acid wash solution and carrying off water of hydration to convert the $$U(C_2O_4)_2 \cdot 6H_2O$$

to $U(C_2O_4)_2 \cdot H_2O$. The change of the green hexahydrate form of the filter cake to the violet monohydrate form provides a convenient visual indication of a satisfactory degree of dehydration. Following dehydration, the filter cake is scraped from the filter element and falls into a container in which it is pulverized for subsequent calcination.

The present invention is admirably adapted to perform the above described recovery of $U(C_2O_4)_2 \cdot H_2O$ from the suspension of $U(C_2O_4)_2 \cdot 6H_2O$ in the hydrochloric acid solution. Referring, for example, to the embodiment of the invention described in Figs. 1 to 9 hereof, the slurry to be filtered is charged into the slurry tank 5, the oxalic acid wash solution is charged into the wash tank 6, and the methyl alcohol is charged into the drying liquid tank 7. The apparatus is then manipulated exactly as described above in disclosing the structure and operation of this embodiment of the invention.

In those instances in which there is specified above the materials from which parts of the apparatus should be constructed, the selection of materials was made with the Boyer process in mind. When handling different slurries, wash solutions, and drying liquids, changes in the specified materials may be desirable to prevent attack of certain parts of the apparatus by the liquids in contact therewith.

The embodiments of the present invention described with reference to Figs. 10 and 11 are equally well adapted for handling the $U(C_2O_4)_2 \cdot 6H_2O$ slurry in question and possess the added advantage that reslurrying in the wash tank, or in both the wash and drying liquid tanks, effects a more thorough elimination of the metal impurities present in the original slurry without increasing the cost of the apparatus out of proportion to the advantage obtained for relatively large scale operations.

In the light of the foregoing disclosure, it will be apparent that various modifications of the invention may be made. It is intended to cover in the appended claims all such modifications as fall within the true spirit and scope of the invention and I do not therefore desire to limit the invention to the exact details shown except in so far as they may be defined in the following claims.

What is claimed is:

1. Filtering apparatus comprising a hollow porous filter element having an opening at one end, a non-porous closure secured to said filter element and closing the open end thereof, a valve unit having a rotatable portion carrying a first port and a non-rotatable portion carrying a plurality of additional ports, a first tubular structure secured at one end to said closure and supporting said filter element and secured at its opposite end to the rotatable portion of said valve unit, a first conduit housed within said first tubular structure and projecting at one end through said closure into communication with the interior of said filter element and communicating at its opposite end with said first port, a second tubular structure secured at one end to the non-rotatable portion of said valve unit for supporting said first tubular structure and said valve unit, and a plurality of pressure differential conduits corresponding to the number of said additional ports extending into said second tubular structure and into communication respectively with said additional ports, said valve unit being operable by rotation of the rotatable portion thereof to place said first port in communication with said additional ports individually in a predetermined sequence.

2. Filtering apparatus comprising a tubular filter support, a hollow porous filter element having an opening at one end, a filter head comprising a tubular member closed at one end by a generally disk-shaped end wall having a central aperture therein and closed at its opposite end by a generally disk-shaped end wall having an apertured boss centrally located therein, said filter element being mounted on said first end wall with its end opening closed thereby, a first conduit mounted in communication with the aperture in the boss on said second end wall and extending through said tubular member and through the aperture in said first end wall into communication with the interior of said filter element, said filter head being secured for ready detachment to one end of said tubular filter support, and a second conduit housed within said tubular filter support, the boss of said second end wall of said filter head being arranged to engage one end of said second conduit in said supporting column and to constitute a coupling between it and said first conduit in said filter head.

3. Filtering apparatus comprising a hollow porous filter element having an opening at one end, a non-porous closure secured to said filter element and closing the open end thereof, a first tubular structure secured at one end to said closure and supporting said filter element, a valve unit secured to the other end of said first tubular structure, a first conduit housed within said first tubular structure and projecting at one end through said closure into the interior of said filter element and communicating at its opposite end with said valve unit, a second tubular structure secured at one end to said valve unit and supporting said valve unit and said first tubular structure, a plurality of pressure differential conduits extending into said second tubular structure and communicating with said valve unit, a first port in said valve unit communicating continuously with said first conduit, and a rotatable passageway in said valve unit continuously communicating with said first port and adapted to communicate with each of said conduits individually in a predetermined sequence.

4. A pressure differential filtering apparatus comprising a vertically movable tubular support mounted upon a supporting framework, a hollow porous filter element rotatably mounted on said tubular support, a valve unit having a rotatable portion attached to said filter element and a non-rotatable portion attached to said tubular support, a tube communicating with one side of said valve unit and extending into the interior of said filter element, a plurality of conduits housed within said tubular support and communicating with the other side of said valve unit, and a passage through the rotatable portion of said valve unit adapted to place said tube in communication with each of said plurality of conduits individually in a predetermined sequence upon rotation of the filter element.

References Cited in the file of this patent

UNITED STATES PATENTS

| | | |
|---|---|---|
| 167,880 | Donning | Sept. 21, 1875 |
| 450,204 | Warden | Apr. 14, 1891 |
| 524,155 | Williamson et al. | Aug. 7, 1894 |
| 743,652 | Moore | Nov. 10, 1903 |
| 887,268 | Porter et al. | May 12, 1908 |
| 919,628 | Oliver | Apr. 27, 1909 |
| 945,193 | Ridgway | Jan. 4, 1910 |
| 1,051,620 | Neil | Jan. 28, 1913 |
| 1,198,216 | Hanson | Sept. 12, 1916 |
| 1,378,929 | Wurscher | May 24, 1921 |
| 1,429,913 | Keene | Sept. 19, 1922 |
| 1,548,160 | Newman | Aug. 4, 1925 |
| 2,068,257 | Banks et al. | Jan. 19, 1937 |
| 2,371,895 | Kingman | Mar. 20, 1945 |
| 2,381,462 | Naugle | Aug. 7, 1945 |